United States Patent
Hoffmeier

(10) Patent No.: US 6,872,055 B1
(45) Date of Patent: Mar. 29, 2005

(54) MUD SUCTION UNIT

(75) Inventor: Dieter Hoffmeier, Ibbenbüren (DE)

(73) Assignee: Oase Wubker GmbH & CO KG, Horstel (DE)

( * ) Notice: Subject to any disclaimer, the term of this patent is extended or adjusted under 35 U.S.C. 154(b) by 0 days.

(21) Appl. No.: 10/070,138

(22) PCT Filed: Aug. 25, 2000

(86) PCT No.: PCT/DE00/02921

§ 371 (c)(1),
(2), (4) Date: Mar. 4, 2002

(87) PCT Pub. No.: WO01/17916

PCT Pub. Date: Mar. 15, 2001

(30) Foreign Application Priority Data

Sep. 3, 1999 (DE) .......................................... 199 42 187

(51) Int. Cl.[7] ........................... F04B 49/00; F04B 49/06
(52) U.S. Cl. ....................... 417/36; 417/44.2; 137/204

(58) Field of Search ............................. 417/36, 33, 44.1, 417/44.2, 423.2, 900; 37/317, 326; 137/204, 205

(56) References Cited

U.S. PATENT DOCUMENTS

| | | | | |
|---|---|---|---|---|
| 2,767,904 A | * | 10/1956 | Doyle | 417/423.2 |
| 3,549,015 A | * | 12/1970 | Willinger | 210/416.2 |
| 3,706,319 A | * | 12/1972 | Neese et al. | 137/205 |
| 4,507,054 A | * | 3/1985 | Schoenmeyr | 417/121 |
| 4,801,376 A | * | 1/1989 | Kulitz | 210/123 |

FOREIGN PATENT DOCUMENTS

EP    0 353 547 A1  *  2/1990

* cited by examiner

Primary Examiner—Cheryl J. Tyler
Assistant Examiner—Timothy P. Solak
(74) Attorney, Agent, or Firm—Dowell & Dowell, P.C.

(57) ABSTRACT

The invention relates to a mud suction unit having a suction element which is connected to a receiving container and has a motor for the generation of a suction flow and also has a discharging element attached to the receiving container.

8 Claims, 2 Drawing Sheets

MUD SUCTION UNIT

The present invention relates to a mud suction unit.

A mud suction unit of this type has the disadvantage that the relatively quickly filled receiving containers must be emptied in a very expensive manner. To empty the device, it is necessary to shut off the motor of the device and to bring the device to a suitable emptying site in order to open it and to empty the receiving container out.

A procedure of this type results in many time-consuming interruptions of the mud suction process when cleaning a garden pond or the like.

Therefore, the object of the present invention is to create a mud suction unit with which a mud suction process can be carried out with considerably fewer time-consuming interruptions.

This object is solved by the present invention.

According to an aspect of the invention there is provided a mud suction unit which has a receiving container, to which a suction element is attached for drawing in a muddy fluid and a discharging element for setting the muddy fluid that has been drawn in into motion. The discharging container has a filling limit for the muddy fluid, and a motor for generating a suction flow. The mud suction unit comprises a shut-off mechanism operable to shut off the motor automatically when the filling limit of the muddy fluid is reached, characterized therein that the discharging element comprises a vacuum valve which is closed during a suction process due to the negative pressure present in the receiving container and opened when the motor is switched off automatically by the shut-off mechanism due to the change in internal pressure present in the receiving container.

Figure 1:
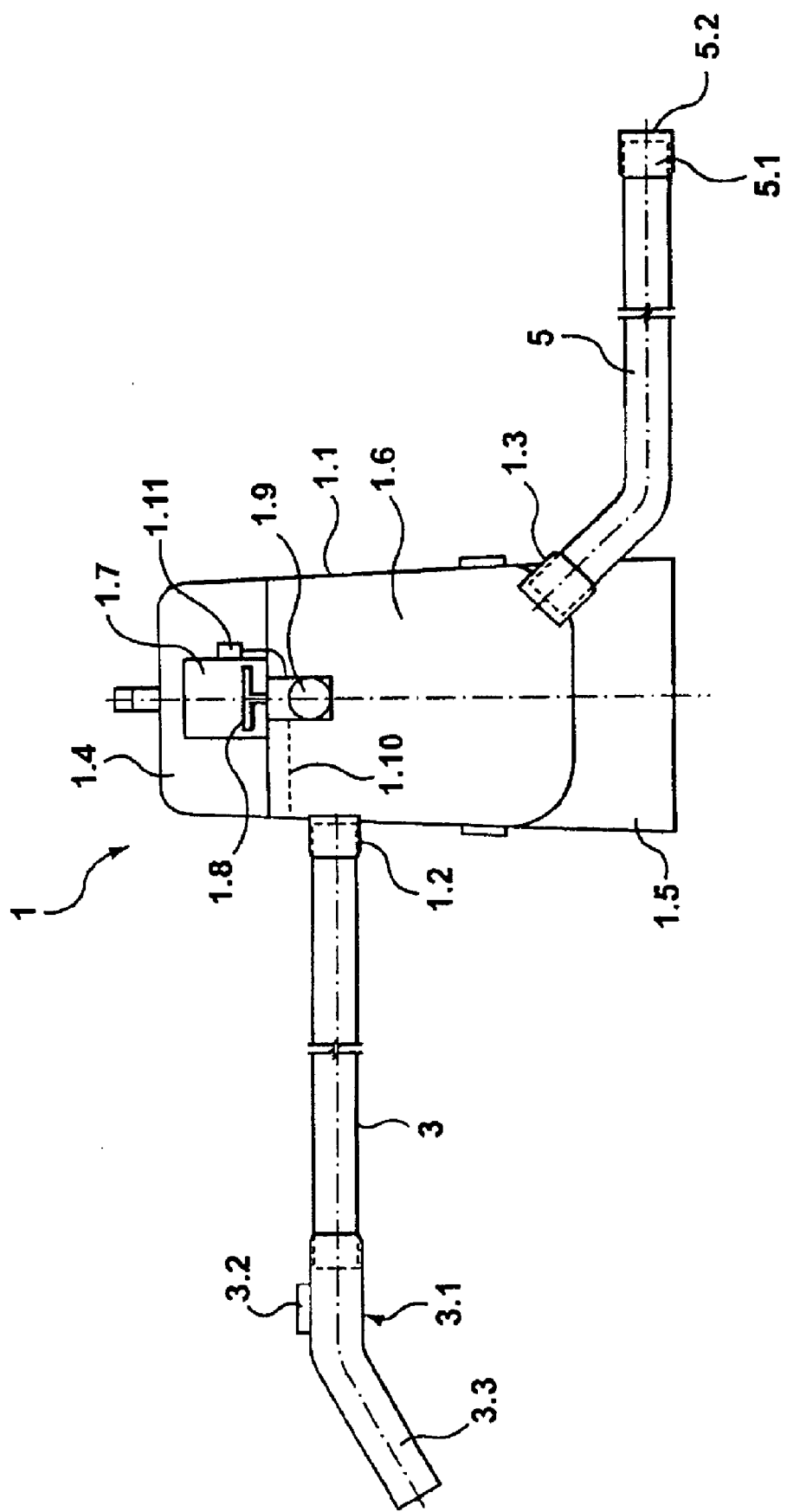
Figure 2A:
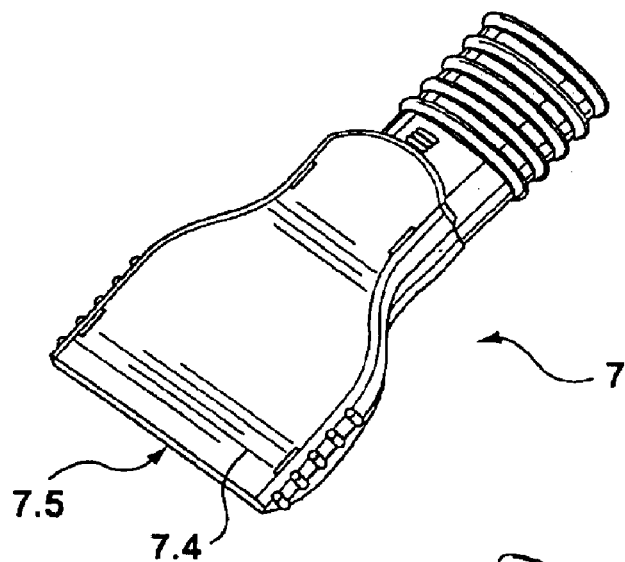
Figure 2B:
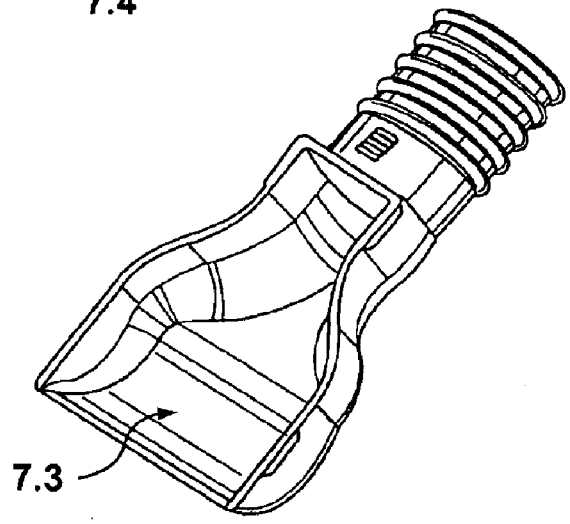
Figure 2C:
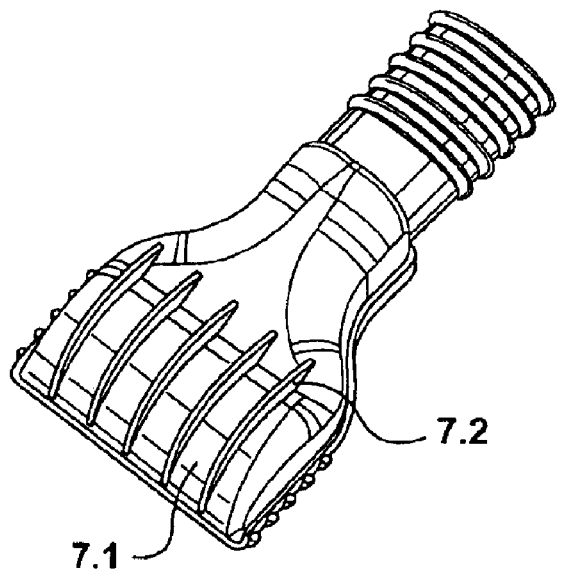

An embodiment of the present invention will be described in greater detail in the following with reference to the drawings, showing:

FIG. 1 a schematic view of a mud suction unit of the present invention;

FIGS. 2a, b, c a schematic view of a suction nozzle of the mud suction unit according to the invention, from the top (FIG. 2a), from the top without cover (FIG. 2b) and from the bottom (FIG. 2c).

The mud suction unit 1 according to the invention comprises a housing 1.1 on which a connection 1.2 is formed for a suction element 3 and a connection 1.3 for a discharging element 5. In addition, the housing 1.1 is designed as a cover 1.4 in its upper region away from the base, said cover being detachably fastened to the lower housing 1.1. At the base, the housing 1.1 is provided with a foot ement 1.5. In its middle area, the inside of the housing 1.1 is formed as a receiving container 1.6 for mud and water or materials having a similar consistency. The connection is situated in the upper part of the receiving container 1.6 and the connection 1.3 in the lower part of the receiving container 1.6, preferably diametrically opposite the connection 1.2.

A motor, preferably an electromotor, is situated above the receiving container 1.6, i.e. above the area in the housing 1.1. that can be filled with mud and water, said motor driving a generally known suction device 1.8, such as e.g. an air-drawing blade element. Air is drawn in from the receiving container 1.6 during operation and released outward via openings in the upper housing region. This results in a negative pressure in the suction element 3.

The motor 1.7 is connected with a ball valve 1.9. The ball valve 1.9 is situated in the vicinity of the filling limit 1.10 provided in the receiving container 1.6. With increasing filling of the receiving container 1.6 and when the filling limit is attained, the ball valve is brought into a closed position which causes the motor 1.7 to run audibly quicker.

The suction element 3 is detachably fastened in a generally known manner to the connection 1.2 and comprises a radio remote control 3.2 in a grip area 3.1. Furthermore, a suction tube 3.3 is formed on the free end of the suction element 3, on which a suction nozzle 7 (FIG. 2a, b, c) can be placed. The suction element 3 can be a hose or a pipe.

The discharging element 5 is detachably fastened in a generally known manner to the connection 1.3 an comprises a vacuum valve 5.2 at its free end 5.1. The discharging element 5 is also a hose or a pipe.

It functions as follows;

The suction element 3 hangs in the water in the vicinity of the bottom of the pond with the suction tube 3.3 and, optionally, with the suction nozzle 7. By switching on the motor 1.7 via the remote control 3.2, a suction process begins. Via the suction tube 3.3, mud is drawn in from the bottom of the pond by the suction element 3 into the receiving container 1.6. The receiving container 1.6 and the discharging element 5 slowly fill with mud up to the vacuum valve 5.2. The vacuum valve 5.2 is closed due to the negative pressure that prevails. When the filling limit is reached in the receiving container 1.6, the ball valve 1.9 closes, as a result of which the motor 1.7 runs audibly quicker. This is the indication for the user to switch the motor 1.7 off via the remote control 3.2. The suction tube 3.3 can thereby remain hanging unchanged in the water. By switching the motor 1.7 off, the negative pressure in the receiving container 1.6 disappears, so that the vacuum valve 5.2 now opens due to the internal pressure produced by the mud and the mud runs out via the discharging element 5 until the receiving container 1.6 is empty again. The motor 1.7 can then be switched on again via the remote control 3.2, so that the process is repeated.

In further embodiments, it would be feasible to further automate the on and off switching mechanism. When a specific maximum fill level is attained, the motor 1.7 could be switched off automatically via sensors, such as sensor 1.11, and when a minimum fill level is attained, it would be automatically switched on again, until the user actuates a main switch from the outside to switch it off.

In addition to the remote control 3.2, a switching arrangement can also be provided directly on the mud suction unit 1.

The suction power is optimized if the suction nozzle 7 is placed on the suction tube 3.3 with a preset cross section. The connection is made via known insert-and-turn plug systems. The suction nozzle 7 is formed with a claw-type lower part 7.1 (FIG. 2c) that has a number of webs 7.2 which are arranged in direction of suction. These webs 7.2 cause the mud to loosen, so that suspended materials are whirled up and coarser components such as pebbles and sand remain on the bottom of the pond. The claw-type lower part 7.1 has a nozzle opening 7.3 (FIG. 2b). The nozzle opening 7.3 which is open to the upper end of the suction nozzle 7 is sealed by a cover 7.4 (FIG. 2a). The cover 7.4 is movably fastened to the lower part 7.1 in direction of suction. A auction slit 7.5 is formed between the lower part 7.1 and the cover 7.4, at the end, the width of whose opening can be adjusted by shifting the cover 7.4 on the lower part 7.1. In this way, it can be prevented that small fish and other small animals get into the suction nozzle.

The suction nozzle 7 can also be used in hard shell ponds when turned by 180°. The smooth upper end of the cover 7.4 can then be moved directly over the bottom of the pond.

What is claimed is:

1. A mud suction unit having a receiving container, to which a suction element is attached for drawing in a muddy fluid and a discharging element for setting the muddy fluid that has been drawn in into motion, said discharging container having a filling limit for said muddy fluid, and a motor for generating a suction flow, the mud suction unit comprising a shut-off mechanism operable to shut off said motor when said filling limit of the muddy fluid is reached, characterized therein that the discharging element comprises a vacuum valve which is closed during a suction process due to the negative pressure present in the receiving container and opened when the motor is switched off by said shut-off mechanism due to the change in internal pressure present in the receiving container.

2. A mud suction unit according to claim 1, characterized therein that the shut-off mechanism comprises that the motor is connected with a ball valve which is situated in the area of said filling limit in the receiving container and which closes in response to pressure applied to said ball valve by said muddy fluid when the filling limit is reached.

3. A mud suction unit according to claim 1, characterized therein that the receiving container has a connection for the suction element in an upper part of the receiving container at a cover end and a connection for the discharging element in a lower part of the receiving container at a bottom end.

4. A mud suction unit according to claim 3, characterized therein that the suction element connection is diametrically opposite the discharge element connection.

5. A mud suction unit according to claim 1, characterized therein that the suction element has a grip area at which a remote control is located for switching the motor on or off.

6. A mud suction unit according to claim 1, characterized therein that a suction tube is formed at one free end of the suction element on which a suction nozzle can be placed, the suction nozzle being provided with a claw-type lower part which has a number of webs.

7. A mud suction unit according to claim 6, characterized therein that the suction nozzle has a suction slit, the width of whose opening being adjustable.

8. A mud suction unit according to claim 1, characterized therein that said shut-off mechanism is operable to shut off said motor automatically.

* * * * *